Jan. 13, 1959 P. AMBRETTE 2,868,144
APPARATUS FOR DEAERATING ALIMENTARY
PASTE, DOUGH AND LIKE SUBSTANCES
Filed Dec. 2, 1954 2 Sheets-Sheet 1

INVENTOR.
Paul Ambrette,
BY George S. Richards,
Attorney

Jan. 13, 1959  P. AMBRETTE  2,868,144
APPARATUS FOR DEAERATING ALIMENTARY
PASTE, DOUGH AND LIKE SUBSTANCES
Filed Dec. 2, 1954  2 Sheets-Sheet 2

INVENTOR.
Paul Ambrette,
BY George D. Richards
Attorney

United States Patent Office 2,868,144
Patented Jan. 13, 1959

2,868,144

APPARATUS FOR DEAERATING ALIMENTARY PASTE, DOUGH AND LIKE SUBSTANCES

Paul Ambrette, Westbury, N. Y.

Application December 2, 1954, Serial No. 472,623

6 Claims. (Cl. 107—31)

This invention relates to apparatus for deaerating alimentary paste, dough and like substances; this application being a continuation in part of my copending application for Letters Patent Serial No. 411,909, filed February 23, 1954, and now abandoned.

The invention has for an object to provide novel apparatus for deaerating alimentary paste, dough and like substances during the process of continuously mixing the ingredients thereof, kneading the mixture and finally delivering the same to a shaping die or other means for molding it to a desired form of commercial product.

The invention has for a further object to provide, in combination with a paste or dough mixing trough, a vacuum tight vacuumized chamber into which the paste or dough, prepared in the mixing trough, is continuously delivered through a sectoral pocketed rotary air lock means which communicates, on its receiving side, with the discharge end of the mixing trough, and, on its discharge side, with the receiving end of the vacuumized chamber, for movement through the latter subject to deaeration; means being further provided for discharging the deaerated paste or dough from the vacuumized chamber, for subsequent shaping or other treatment.

The invention has for another object to provide a mixing trough, open to the atmosphere, into the receiving end of which the ingredients of paste or dough are delivered, means being provided within said trough operative to mix said ingredients so as to produce a non-compacted paste or dough of discrete or more or less coarse granular condition, said means also serving to advance the thus produced paste or dough toward the discharge end of the mixing trough, and to provide, in relation to the discharge end of such mixing trough, a sectoral pocketed rotary air lock means to receive the dough or paste therefrom, said air lock means being operative to deliver said paste or dough into a vacuumized chamber subject to deaerating effect therein, said vacuumized chamber being also provided with means for moving the paste or dough therethrough to a point of discharge therefrom, and thence to means provided for conveying the deaerated paste or dough to a shaping die, said latter means being of a type adapted, when charged with the paste or dough, to seal the vacuumized chamber from the atmosphere.

The above and other objects will be understood from a reading of the following detailed description of this invention in connection with the accompanying drawings, in which:

Fig. 4 is a fragmentary transverse vertical section through the discharge end of the vacuumized chamber of the apparatus, but showing a modified means for discharging deaerated paste or dough therefrom.

Like characters of reference are employed in the above desribed views, to indicate corresponding parts.

Figure 1:
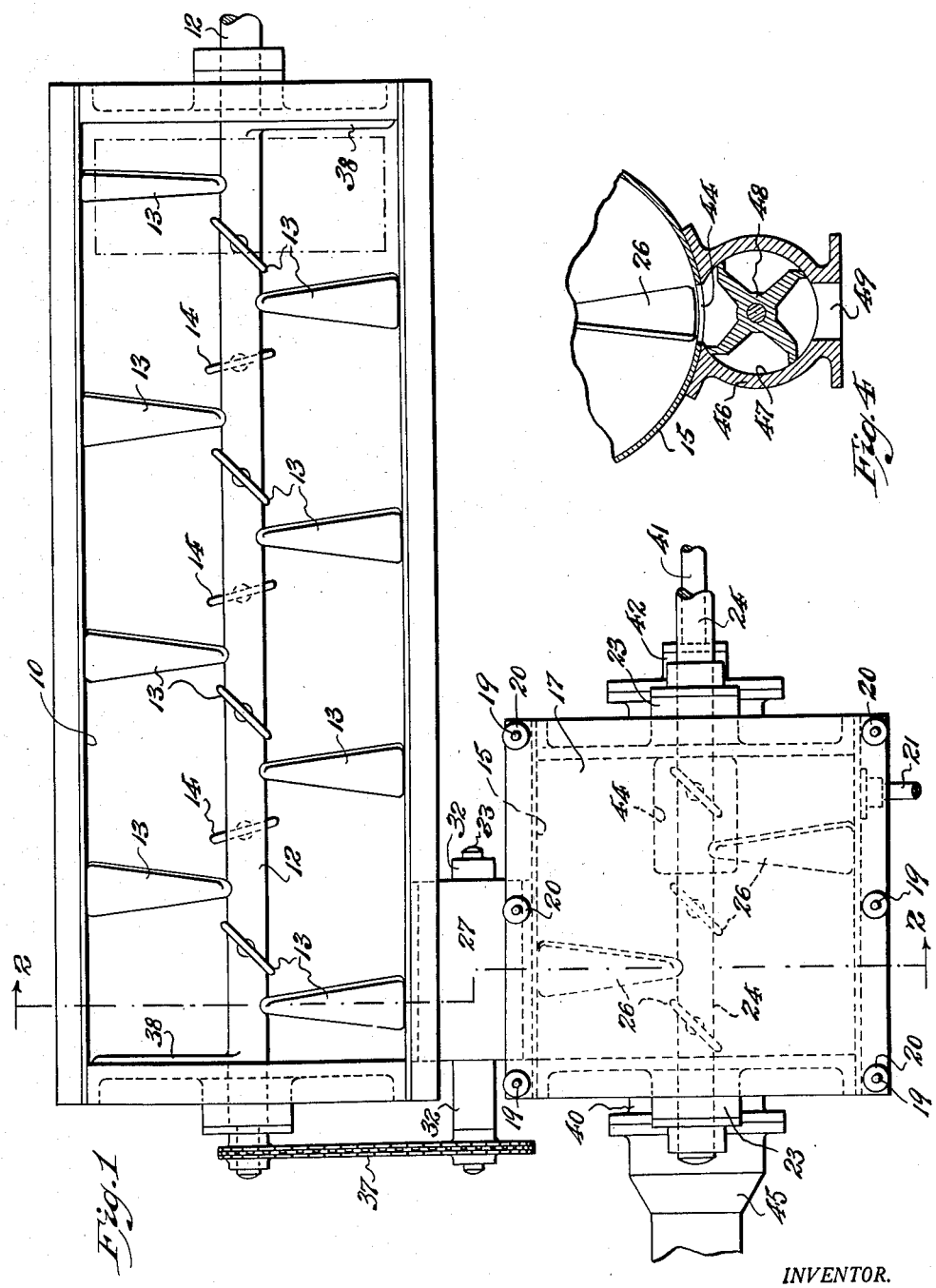
Fig. 1 is a plan view of apparatus for mixing and deaeratiing alimentary paste or dough.
Figure 2:
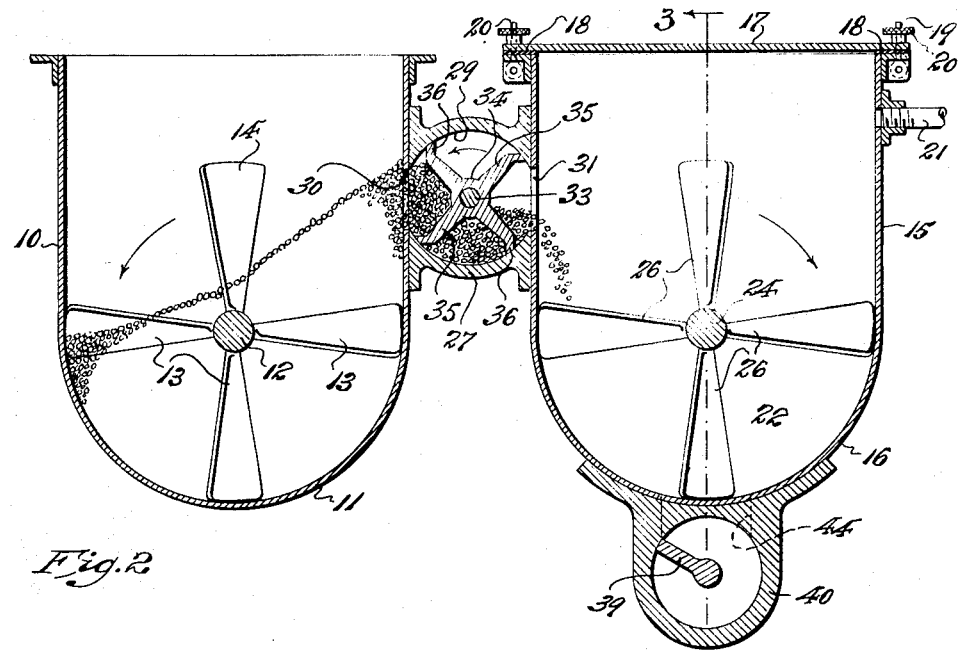
Fig. 2 is a transverse vertical section through the apparatus, taken on line 2—2 in Fig. 1.

Referring to the drawings, the reference character 10 indicates a longitudinal mixing trough which is upwardly open to the atmosphere, the same having a semi-cylindrical bottom 11. The ingredients from which the alimentary paste or dough is to be produced, e. g. suitable flour or flour and water, are delivered into the mixing trough by suitable metering means (not shown) located above the receiving end thereof, said location being indicated by dot and dash lines in Fig. 1. Extending longitudinally through the interior of the mixing trough 10 is a driven shaft 12, which is concentric to the semi-cylindrical bottom 11 of said trough. Suitably affixed to and spaced along the shaft 12 are a series of radial paddles which, as revolved by said shaft, function to mix and blend the flour and water into the paste or dough mixture in discrete more or less coarse granular form. Said shaft and paddles are rotated counterclockwise (as viewed in Fig. 2), and certain of said paddles, namely the paddles 13, are so angularly pitched in one direction that, in addition to the mixing effect thereof, they also serve to propel the produced paste or dough onward through the trough toward the discharge end thereof. Intermediate groups of said paddles 13 are other paddles 14, which are angularly pitched in an opposite direction, and preferably at a lesser angular degree. These paddles 14, tend to temporarily reverse the movement of the paste or dough toward the discharge end of the trough, and thus effect an agitation of the ingredients undergoing mixture which rapidly promotes the mixing thereof so as to produce a paste or dough in desired discrete more or less coarse granular globular form.

Figure 3:
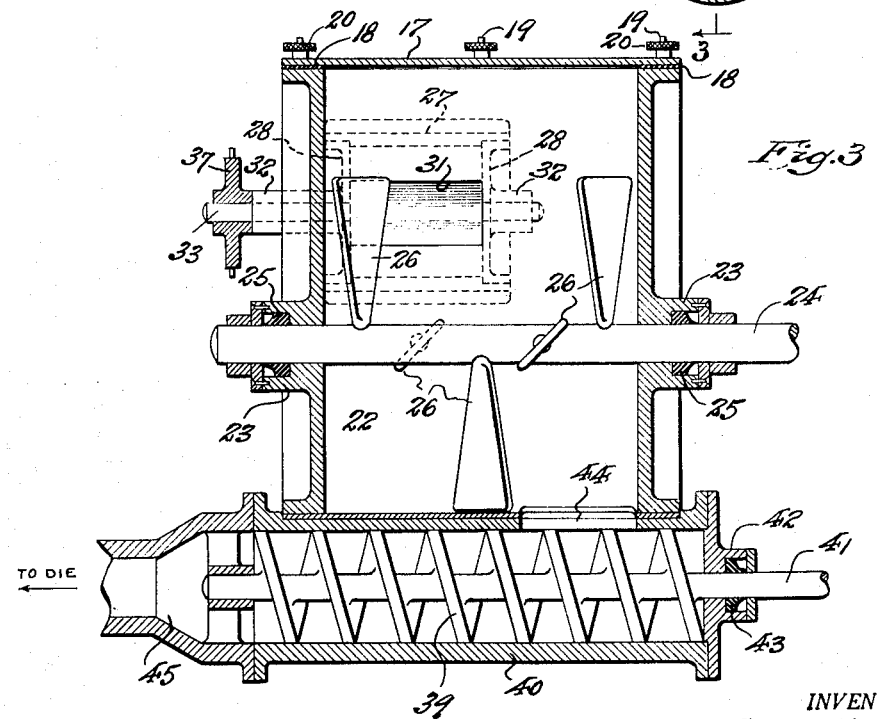
Fig. 3 is a longitudinal sectional view, through the vacuumized chamber of the apparatus, taken on line 3—3 in Fig. 2.

Disposed parallel to the discharge end portion of the mixing trough 10 is a paste or dough deaerating trough 15, which also possesses a semi-cylindrical bottom 16. The open top of the deaerating trough is closed by a cover plate 17, which is sealed thereto by an interposed gasket 18. Said cover plate 17 is secured in closed and sealed relation to the deaerating trough by suitable fastening means, such as a plurality of tie-bolts 19 and cooperative fastening nuts 20. Communicating with the upper interior of the deaerating trough is a suction conduit or pipe 21 which leads to a vacuum pump (not shown). When the deaerating trough is closed and sealed, and evacuated by the vacuum pump, the interior 22 thereof provides a vacuumized chamber. Supported by bearings 23, with which the end walls of the deaerating trough are provided, is a driven shaft 24, which is disposed to extend longitudinally through the vacuumized chamber 22 concentric to the cylindrical bottom 16 of said deaerating trough. Said bearings are provided with seal elements 25, which seal the bearings and shaft 24 against admission of air therebetween into the vacuumized chamber, so that the latter is maintained vacuum tight. Suitably affixed to and spaced along said shaft 24 are a series of radial paddles 26. Said shaft and paddles are rotated clockwise (as viewed in Fig. 2), and the paddles are so angularly pitched as to propel paste or dough, which is delivered into the vacuumized chamber 22, from the receiving end thereof towards its discharge end, and in direction counter to the direction of movement of the paste or dough in the mixing trough 10. It will be understood that said shaft 24 and paddle 26 can, if desired, be rotated counterclockwise in which case the paddles 26 would be angularly pitched in opposite direction from that shown in Figs. 1, 2, and 3.

The mixing trough 10 and deaerating trough 15 are laterally spaced apart whereby to permit a sectoral pocketed rotary air lock means to be connected to and between the opposed inner side walls of said troughs intermediate the tops and bottoms thereof, on an axis parallel to the longitudinal axes of said troughs, and so as to be positioned between a discharge end portion of the mixing trough, and the receiving end portion of the deaerating trough. Said rotary air lock means comprises a casing 27, the ends of which are closed by end walls 28 (see Fig. 3). The interior of the casing 27 provides a cylindrical air lock chamber 29, which extends in longitudinally parallel relation to and between the mixing and deaerating troughs. The air lock chamber 29 is open at its one or receiving side for communication with a discharge port 30 with which the inner side wall of the mixing trough 10 is provided, and is likewise open at its opposite or discharge side for communication with an intake port 31 with which the inner side wall of the deaerating trough 15 is provided. Supported by bearings 32, with which the end walls 28 of the casing 27 are provided, is a driven shaft 33 disposed to extend axially through the cylindrical air lock chamber 29. Said bearings 32 may be provided with seal elements (not shown) but similar to the seal elements 25 of the deaerating trough shaft 24, whereby to seal said bearings 32 and shaft 33 against admission of air therebetween into the air lock chamber 29. Fixed on the shaft 33, so as to be rotated thereby, is an air lock rotor 34 having a plurality of radial arms or gate members 35, preferably four in number spaced 90° apart, thereby providing intermediate the same successive sectoral pockets which open outwardly at the circumference of the rotor. The perpendicular ends of the air lock rotor slidingly engage the inner surfaces of the casing end walls 28 with substantial sealing effect. The free end portions of the rotor gate members 35, which slidingly engage the internal circumferential surface of the air lock chamber 29, are shaped to provide rearwardly inclined angular extremities 36 which are acute to said circumferential surface of the air lock chamber. As the rotor arms or gate members 35 revolve, a small portion of paste or dough will be wedged and compacted within the angular space between said extremities 36 and the circumferential surface of the air lock chamber with sealing effect. It will be obvious that at least two oppositely extending gate members 35 of the air lock rotor 34 are in contact with and bridge across the air lock chamber 29 in all rotating positions of the rotor, and, consequently, the air lock chamber is sealed against any substantial influx of air therethrough into the vacuumized chamber 22 provided by the deaerating trough 15, while at the same time the sectoral spaces intermediate the radial arms or gate members 35 will function as conveyer pockets for moving discrete more or less granular masses of paste or dough through the air lock chamber 29 from the mixing trough 10 to the deaerating trough 15, without compression thereof or change of its discrete or loose substantially granular character. Suitable power transmission means is provided for driving the air lock rotor 34. Preferably, said air lock rotor is driven by chain and sprocket transmission 37 from the shaft 12 of the mixing trough at a four to one ratio; e. g., the shaft 12 may be rotated at 60 R. P. M. and the air lock rotor at 15 R. P. M.

In the use of the apparatus, the mixing of the ingredients from which the paste or dough is produced, as effected by the operation of the mixing trough means, results in the formation of a paste or dough which is of discrete more or less coarsely granular form. The paddles 13, as revolved counterclockwise within the mixing trough 10, function to move the formed discrete paste or dough toward the discharge end of said mixing trough, and so as to pile up a loose more or less coarsely granular mass of the paste or dough against the end wall and inner side wall of the mixing trough 10. Said scraper blades 38 adapted to be revolved by the shaft 12 can be provided to prevent the paste or dough from adhering to the end wall of the mixing trough. The paddles 13 adjacent the end wall, which, in their revolving circuit, undergo rising movement adjacent the inner side wall of the mixing trough in which the discharge port 30 is located, tend to lift and pile a loose mass of the discrete paste or dough across said discharge port 30, so that portions of such discrete mass of paste or dough discharge therethrough into successive sectoral conveyer pockets of the rotated air lock rotor 34. The discrete paste or dough thus received by the air lock rotor is carried thereby through the air lock chamber 29, and thence delivered through the intake port 31 into the vacuumized chamber 22 of the deaerating trough 15 still in discrete, non-compacted, more or less coarsely granular condition. A substantially high vacuum condition is maintained in the vacuumized chamber 22, so that the little air which may accompany the paste or dough through the air lock means is quickly dissipated, and the exposure of the loose granules of paste or dough to the relatively high vacuum effect or low pressure atmosphere, while moving through the vacuumized chamber, permits air or other gas entrapped in the paste or dough granules to escape and discharge therefrom, while at the same time causing the water and flour ingredients of the granules to intermingle in a more intimate mixture so as to condense the dough granules and consequently the paste or dough will be properly conditioned for shaping to desired form of commercial product, substantially free from undesirable flaws, fissures or air pockets.

Suitable means is provided for discharging the deaerated discrete paste or dough from the vacuumized chamber 22 of the deaerating trough 15 to a desired place of use. In most cases, this discharge means will comprise means for forcing and compacting the deaerated granular paste or dough into a consolidated concrete mass for passage to and through a die or other molding means (not shown) by which the same is shaped to a desired form of commercial product. In such case, the discharge means comprises a screw type conveyer which both compacts and forces the deaerated paste or dough to and through a shaping die or other molding means. A means of this type as shown, comprises a screw conveyer 39 which is rotatably mounted in a housing 40, and which is driven by a shaft 41 which projects exteriorly through bearing means 42 at the rear end of said housing, said bearing means preferably including a seal element 43 between the same and the shaft 41, whereby to exclude influx of air into said housing. The housing 40 is suitably secured to the bottom wall 16 of the deaerating trough 15. An opening or discharge hatchway 44 provides communication between the discharge end of the vacuumized chamber 22 of the deaerating trough 15 and the receiving end of the housing 40. Connected with the discharge end of the housing 40 is a conduit 45 through which the deaerated paste or dough is forced by the conveyer screw 39 to the shaping die or other molding means.

In starting the apparatus, non-deaerated paste or dough is delivered through the deaerating trough 15 to the housing 40 and conveyer screw 39 until the latter is filled with paste or dough, so that such filling of paste or dough effectively seals the discharge means against back flow of air therethrough, and thence through the opening or hatchway into the deaerating trough 15. When the apparatus is thus initially primed, the deaerating trough can then be evacuated, and thereupon the apparatus can be continuously operated to produce and discharge deaerated paste or dough.

The deaerated paste or dough may be discharged from the vacumized chamber 22 of the deaerating trough 15 by gravity, subject to collection for subsequent treatment in use in any desired manner. In this case, the discharge means may be a sectoral pocketed rotary air lock device similar to that above described for delivering paste or dough from the mixing trough 10 into the vacumized chamber 22 of the deaerating trough 15. Such arrangement is shown in Fig. 4, and the air lock device comprises a casing 46 providing an air lock chamber 47, in which is contained an air lock rotor 48 adapted to be driven by suitable power transmission means. The casing 46 is affixed to the bottom of the deaerating trough 15, and is open at its receiving side for communication with the bottom discharge opening or hatchway 44 which leads from said deaerating trough. The casing 46 is provided with an outlet opening 49 for discharging deaerated paste or dough therefrom.

Having now described my invention, I claim:

1. In apparatus for preparing and deaerating alimentary paste dough having a mixing trough provided with means to impart both mixing agitation to dough ingredients productive of a granular dough mixture and movement of the dough mixture through said trough to its discharge end for delivery therefrom through a side discharge port, a closed vacuumized deaerating chamber disposed in side by side relation to said mixing trough and adapted to deliver deaerated dough mixture to a consolidating and shaping means, said deaerating chamber having a dough mixture receiving port opposed to the discharge port of the mixing trough, a rotary air lock means comprising a cylindrical casing affixed to and between the mixing trough and the deaerating chamber, said casing having an intake in register with the discharge port of the mixing trough and an outlet in register with the receiving port of the deaerating chamber, and a driven rotor rotatable in said casing about an axis parallel to the longitudinal axes of said trough and chamber, said rotor having radial gate members defining intermediate sectoral pockets to receive and transfer the granular dough mixture from the mixing trough to the deaerating chamber.

2. In apparatus according to claim 1 wherein the ends of the rotor of the air lock means contact the end walls of the cylindrical casing, and the ends of the radial gate members of said rotor contact the peripheral walls of said casing, said ends of the radial gate members terminating in rearwardly directed angular portions acute to the peripheral walls of said casing, whereby to provide angular space between said portions and said peripheral walls within which dough can be compacted with sealing effect.

3. In apparatus for preparing and deaerating alimentary paste dough having a mixing trough provided with means to impart both mixing agitation to dough ingredients productive of a granular dough mixture and movement of the dough mixture through said trough to its discharge end for delivery therefrom through a side discharge port, a closed vacuumized deaerating chamber disposed in side by side relation to said mixing trough, means operative within said deaerating chamber to agitate and move the granular mixture therethrough to a point of discharge therefrom, and means to receive the discharged dough mixture from the deaerating chamber without breaking the vacuum therein, said latter means being adapted to consolidate the dough mixture for delivery to shaping means, said deaerating chamber having a dough mixture receiving port opposed to the discharge port of the mixing trough, a rotary air lock means comprising a cylindrical casing affixed to and between the mixing trough and the deaerating chamber, said casing having an intake in register with the discharge port of the mixing trough and an outlet in register with the receiving port of the deaerating chamber, and a driven rotor rotatable in said casing about an axis parallel to the longitudinal axes of said trough and chamber, said rotor having radial gate members defining intermediate sectoral pockets to receive and transfer the granular dough mixture from the mixing trough to the deaerating chamber.

4. In apparatus according to claim 3 wherein the ends of the rotor of the air lock means contact the end walls of the cylindrical casing, and the ends of the radial gate members of said rotor contact the peripheral walls of said casing, said ends of the radial gate members terminating in rearwardly directed angular portions acute to the peripheral walls of the casing, whereby to provide angular space between said portions and said peripheral walls within which dough can be compacted with sealing effect.

5. In apparatus according to claim 3, wherein the means to discharge the deaerated dough mixture from the deaerating chamber comprises an enclosed screw type conveyer.

6. In apparatus according to claim 3, wherein the means to discharge the deaerated dough mixture from the deaerating chamber comprises a second rotary air lock means corresponding to the first mentioned rotary air lock means.

References Cited in the file of this patent

UNITED STATES PATENTS

| | | |
|---|---|---|
| 357,435 | Waring | Feb. 8, 1887 |
| 1,331,785 | Rogers et al. | Feb. 24, 1920 |
| 1,538,450 | Stewart | May 19, 1925 |
| 1,746,590 | Hazzle | Feb. 11, 1930 |
| 2,078,565 | Durst et al. | Apr. 27, 1937 |
| 2,298,644 | Hummel | Oct. 13, 1942 |

FOREIGN PATENTS

| | | |
|---|---|---|
| 412,248 | Great Britain | June 25, 1934 |
| 478,017 | Italy | Feb. 12, 1953 |
| 568,093 | Great Britain | Mar. 19, 1945 |
| 568,094 | Great Britain | Mar. 19, 1945 |